United States Patent [19]

Tachikawa

[11] Patent Number: 5,048,107
[45] Date of Patent: Sep. 10, 1991

[54] TABLE REGION IDENTIFICATION METHOD

[75] Inventor: Michiyoshi Tachikawa, Tokyo, Japan

[73] Assignee: Ricoh Company, Ltd., Japan

[21] Appl. No.: 533,346

[22] Filed: Jun. 5, 1990

[30] Foreign Application Priority Data

Jun. 6, 1989 [JP] Japan .................................. 1-143456

[51] Int. Cl.⁵ .............................................. G06K 9/00
[52] U.S. Cl. ........................................ 382/48; 382/22;
382/61; 382/9; 364/225.3; 358/462
[58] Field of Search .................... 382/26, 61, 9, 48, 22;
358/462; 364/225.3

[56] References Cited

U.S. PATENT DOCUMENTS

| | | | |
|---|---|---|---|
| 4,723,298 | 2/1988 | Schiller | 382/56 |
| 4,901,365 | 2/1990 | Kelland | 382/61 |
| 4,932,065 | 6/1990 | Feldgajer | 382/9 |
| 4,933,979 | 6/1990 | Suzuki et al. | 382/61 |

Primary Examiner—David K. Moore
Assistant Examiner—Daniel Santos
Attorney, Agent, or Firm—Mason, Fenwick & Lawrence

[57] ABSTRACT

A method for identifying a table region within an input image data of an original obtained by an optical character reader. The table region identification method comprises the steps of extracting first sets of runs of successive black picture elements from each of the lines of the input image data, unifying adjacent runs among the first sets of the runs into first rectangles, unifying second sets of runs within a second rectangle having a size greater than a prescribed size among the thus unified first rectangles to extract ruled lines, the second sets of the runs having a length greater than a prescribed length, and finally making a decision on whether the second rectangle constitutes a table region or any other region depending on the number of the ruled lines counted.

6 Claims, 7 Drawing Sheets

RUN MEMORY DATA

| RUN NO. | S.P. X VALUE | S.P. Y VALUE | E.P. X VALUE | E.P. Y VALUE |
|---|---|---|---|---|
| 1 | 10 | 20 | 12 | 20 |
| 2 | 14 | 20 | 19 | 20 |
| 3 | 11 | 21 | 13 | 21 |
| 4 | 17 | 21 | 19 | 21 |
| 5 | 17 | 22 | 18 | 22 |

RCTNGL MEMORY DATA BEFORE UPDATE

| RCTNGL NO. | S.P. X VALUE | S.P. Y VALUE | E.P. X VALUE | E.P. Y VALUE |
|---|---|---|---|---|
| 1 | 10 | 20 | 13 | 21 |
| 2 | 14 | 20 | 19 | 22 |
| 3 | | | | |

FIG.4D

RCTNGL MEMORY DATA AFTER UPDATE

| RCTNGL NO | S.P X VALUE | S.P Y VALUE | E.P X VALUE | E.P Y VALUE |
|---|---|---|---|---|
| 1 | 10 | 20 | 13 | 21 |
| 2 | 14 | 20 | 21 | 23 |
| 3 | 24 | 23 | 26 | 23 |
| 4 | | | | |

TABLE REGION IDENTIFICATION METHOD

BACKGROUND OF THE INVENTION

The present invention generally relates to table region identification methods, and more particularly to a method for identifying a table region within an image obtained by a character recognition apparatus from an original document.

A document generally contains not only a character region but also an image region including a drawing region, a photograph region, a table region or the like. When the recognition of such a document is carried out with a character recognition device, it is necessary to apply different techniques to different regions. The recognition of the character region is usually carried out by a character recognition technique. The recognition of the drawing or photograph region is done by storing the data as an image data or by further reading such image data as a pseudo two-level picture data through the dither technique and storing it. And the recognition of the table region is conventionally carried out by recognizing ruled lines of a table as a frame and performing character recognition of the image within the frame. A ruled line herein refers to a vertical or horizontal border or straight line as between columns or between rows of a table or list on a document. The frame described above is made up of horizontal ruled lines and vertical ruled lines.

A region identification technique is the prerequisite for applying the several identifying methods to different regions of the input data read from a document. Among these region identification techniques, a conventional frame pattern identification method may be used for identifying a table region within a document. In such a frame pattern identification method, however, the procedures of extracting long vertical and horizontal lines (which may constitute a possible frame pattern) from the document and of making a decision on whether they actually make up the above mentioned frame pattern are often too complicated to carry out at a practical level, and therefore cause difficulty in accomplishing a high-speed region identification.

SUMMARY OF THE INVENTION

Accordingly, it is a general object of the present invention to provide a novel and useful table region identification method in which the above described problems are eliminated.

Another and more specific object of the present invention is to provide a table region identification method which allows for a speedy, accurate identification of a table region within a document.

Still another object of the present invention is to provide a method for identifying a table region within an input image data of an original obtained by an optical character apparatus, the method comprising the steps of extracting first sets of runs of successive black picture elements from each of the lines of the input image data, unifying adjacent runs among the first sets of the runs into first rectangles, extracting a second rectangle from among the thus unified first rectangles, the second rectangle having a size greater than a prescribed size, unifying second sets of runs from each of the lines within the second rectangle to extract ruled lines, each of the second sets of the runs having a length greater than a prescribed length, counting the number of the ruled lines thus extracted from the second sets of the runs within the second rectangle, and making a decision on whether the counted number of the ruled lines is greater than a prescribed number, thus allowing a determination that the second rectangle constitutes the table region in the input image data. According to the present invention, it is possible to carry out a speedy identification of a table region with a simple algorithm. And it is possible to identify a table region within a document in an accurate manner. The algorithm used in the table region identification steps according to the present invention is simple enough to ensure a high-speed processing.

Other objects and further features of the present invention will be apparent from the following detailed description when read in conjunction with the accompanying drawings.

DESCRIPTION OF THE PREFERRED EMBODIMENTS

Figure 1:
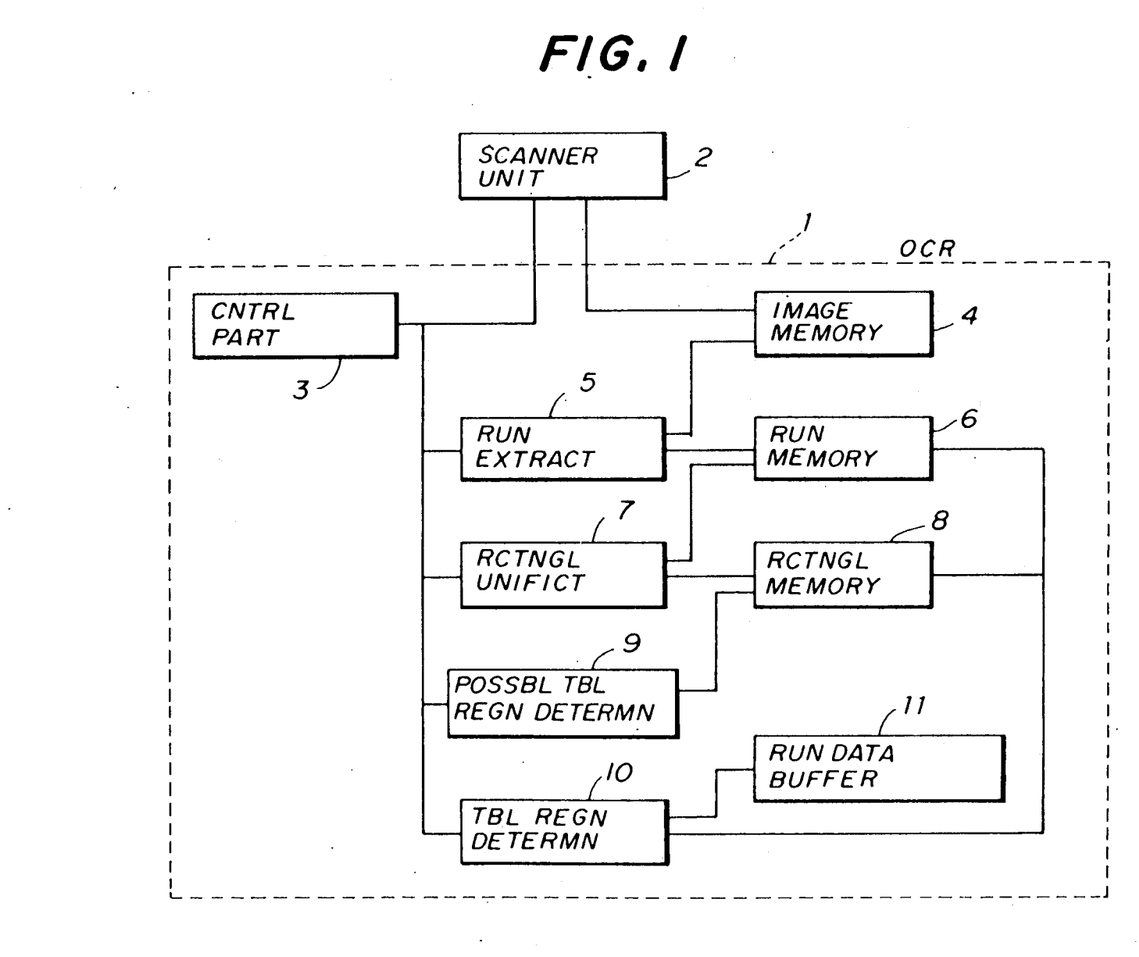
FIG. 1 is a system block diagram showing an embodiment of a table region identification system provided with an optical character reader for carrying out the present invention.

Referring first to FIG. 1, a description will be given of a structure of a table region identification system for carrying out the present invention. There is provided an optical character reader (OCR) 1 in which the table region identification system is constructed. As shown, a scanner unit 2 is provided for reading image information of an original to be processed. The OCR 1 comprises a control part 3 which gives a READ instruction to make the scanner unit 2 read the image data from the original, and to make the image data be stored in an image memory 4. A run extraction part 5 reads from the image memory 4 each single line of the image data, senses x and y coordinate values of a starting point and an end point of a run, and writes the coordinate values and a run number sequentially assigned to the run onto a run memory 6. A run is made up of a series of successive black picture elements in a line of the image data. Picture elements are hereinafter referred to as pixels.

By comparison with the data stored in the run memory 6, a rectangle unification part 7 checks the x and y coordinate values of the starting point of the extracted run as well as the x and y coordinate values of the end point thereof to make a decision. This decision is based on which rectangle of these rectangles stored in a rectangle memory 8 the run should be unified into, or whether it should be unified into a new rectangle not yet stored in the rectangle memory. The rectangle unification part 7 serves to update the data of the rectangle memory 8. The rectangle memory 8 contains a rectangle data which is made up of a rectangle number and x and y coordinate values of a upper left corner (a starting point) and a lower right corner (an end point) of a rectangle.

A possible table region determining part 9 checks the size of each rectangle stored in the rectangle memory 8, finds a rectangle which may make up a possible table region, and transfers the rectangle number of the rectangle to the control part 3. The control part 3 then transfers the rectangle number of the rectangle making up a possible table region to a table region determining part 10.

The table region determining part 10 makes reference to the rectangle data of the rectangle having a specified rectangle number in the rectangle memory 8, gets information of the runs which makes up the rectangle from the run memory 6, extracts a ruled line from runs within the rectangle having a length greater than a prescribed length, makes a decision on whether a region of the input image data is a table region in view of the number of the ruled lines thus extracted, and transfers the results to the control part 3. A run data buffer 11 is employed to store run data for unifying the runs within the rectangle into a ruled line.

A more detailed description will be given of the flow of the above described procedures of a first embodiment of the present invention, by referring to FIGS. 2 through 5.

Figure 2:
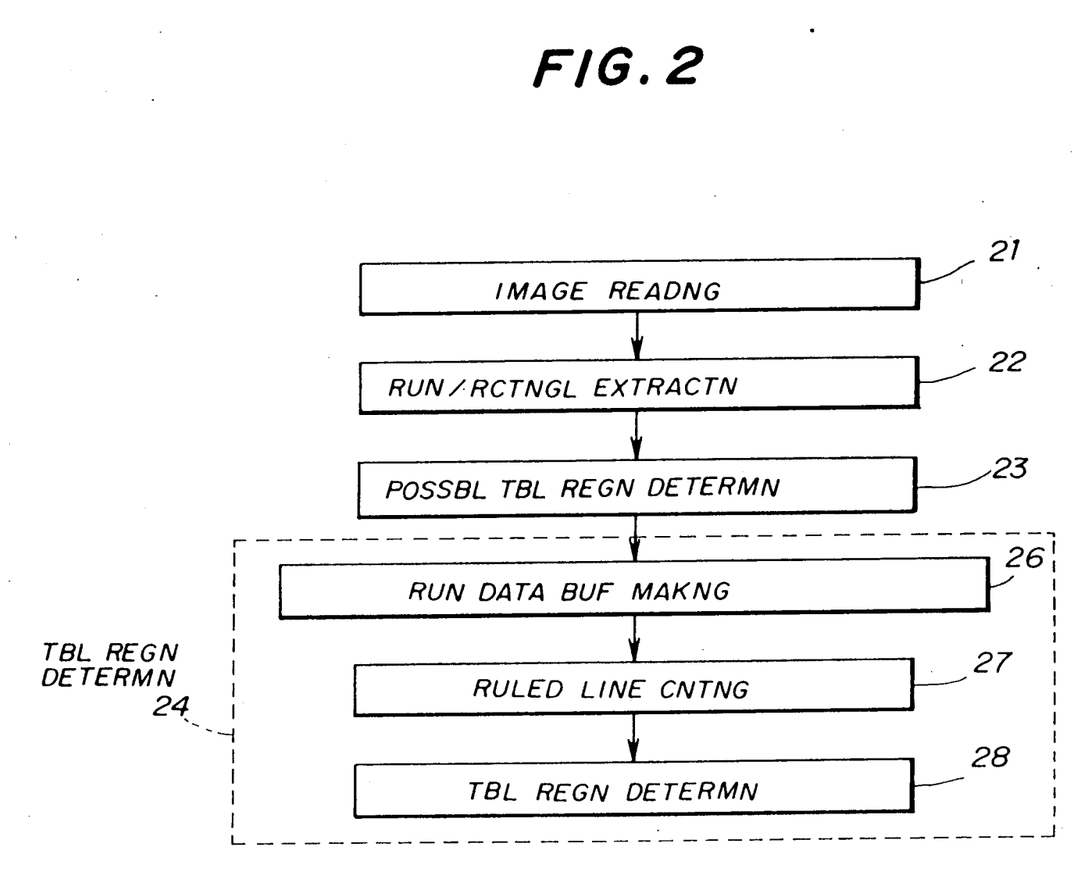
FIG. 2 is a flow chart for explaining the overall procedure of a table region identification method according to the present invention.

FIG. 2 shows the flow of the overall procedure of the first embodiment. An image reading step 21 stores an input image data from an original into the image memory 4. This is done with the scanner unit 2 under control of the control part 3. A run/rectangle extraction step 22 carries out extraction of runs from the input image data as well as unification of the runs into rectangles. The run extraction part 5 and the rectangle unification part 7 respectively play these roles of extraction and unification. FIGS. 3A through 4D show examples of such run extraction and rectangle unification.

Figure 3A:
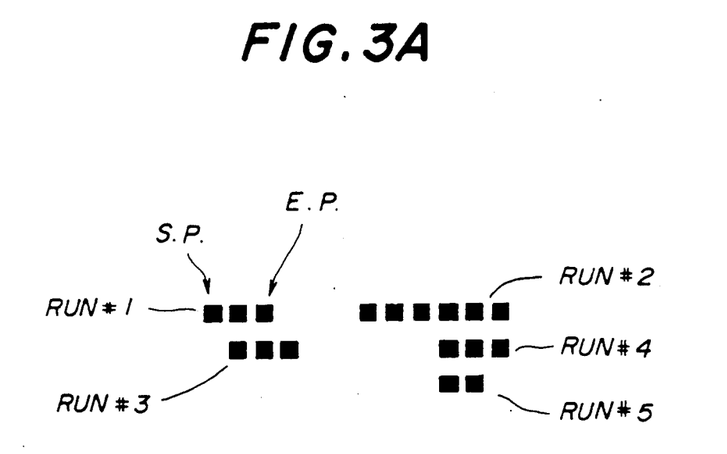
FIGS. 3A and 3B are a schematic diagram and a run memory data list for explaining the run extraction and the run memory data, respectively.
Figure 3B:
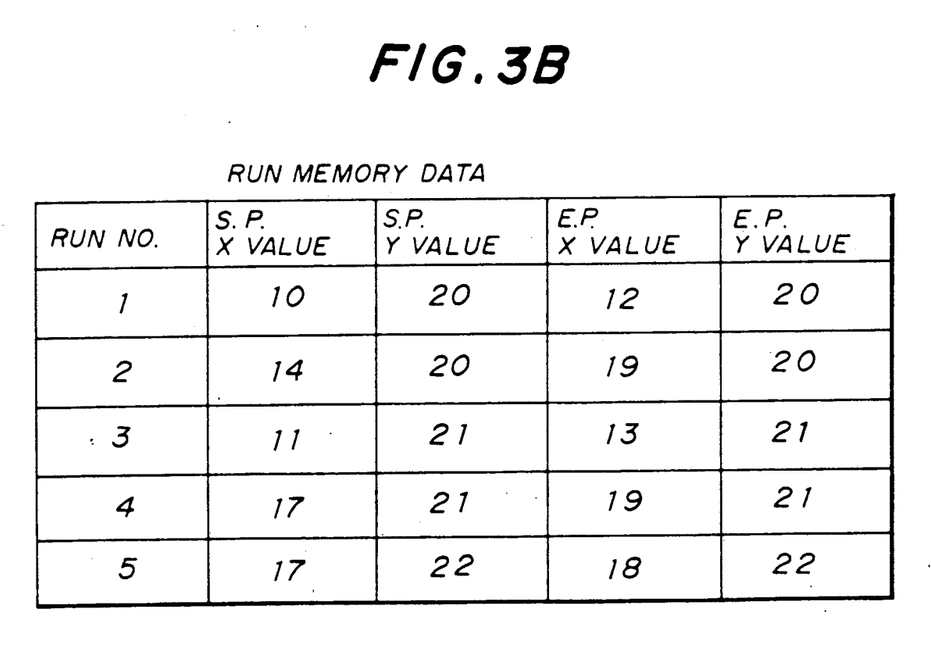

FIG. 3A shows a representative pattern of an image obtained by the OCR. The run extraction part 5 carries out raster scanning of each single line of the input image. Through the scanning by the scanner unit 2, the run extraction part 5 sequentially extracts one or more runs each comprising a series of successive black pixels, for example, runs #1 through #5 as shown in FIG. 3A, and assigns a run number to each run in sequential order of the extraction, and writes x and y coordinate values of a starting point (a left-hand end pixel) and of an end point (a right-hand end pixel) for each run onto the run memory 6. The contents of the run memory 6 shown in FIG. 3B correspond with the pattern of the runs #1 through #5 in FIG. 3A.

The rectangle unification part 7 checks the coordinate values of the starting and end points of the runs and unifies adjacent runs into a rectangle. At the time when five runs as shown in FIG. 3A are checked, the runs #1 and #3 are unified into a rectangle #1 and the runs #2, #4 and #5 are unified into a rectangle #2. And such a rectangle data is stored in the rectangle memory 8, as listed in FIG. 4C.

More specifically, when the run #1 is first extracted, there is no rectangle data registered in the rectangle memory 8. A rectangle #1 with the data of coordinate values of the starting and end points equal to those of run #1 is newly registered in the rectangle memory 8. In this case, an upper left corner (starting point) and a lower right corner (end point) of rectangle #1 respectively agree with the starting and end points of run #1. When the run #2 is next extracted, this run is not located close to the run #1, and another rectangle #2 with the data of coordinate values of the starting and end points in agreement with those of the run #2 is newly registered. When the run #3 is next extracted, this run is located close to the run #1 and therefore unified into the rectangle #1. In the rectangle memory 8 at this time, the starting point of rectangle #1 has the same x and y coordinate values as those of the starting point of run #1, but the end point of rectangle #1 is changed from the end point of run #1 to the end point of run #3. In a similar manner, the run #4 and the run #5 are unified into the rectangle #2. At a result, the y coordinate value of the end point of rectangle #2 is changed from that of the end point of run #2 to that of the end point of run #5, and the other values of rectangle #2 remain unchanged from those before the unification of runs #4 and #5.

Figure 4A:
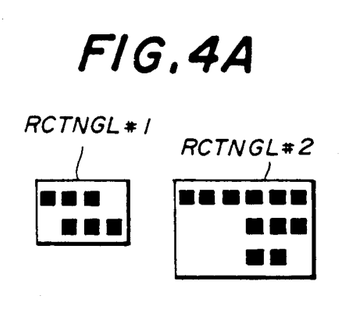
FIGS. 4A and 4B are schematic diagrams for explaining the unification of runs into a rectangle.
Figure 4B:
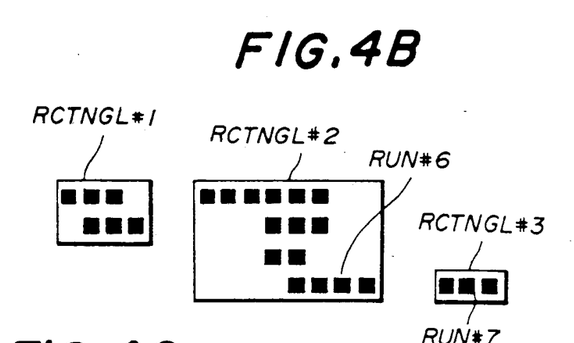
Figure 4C:
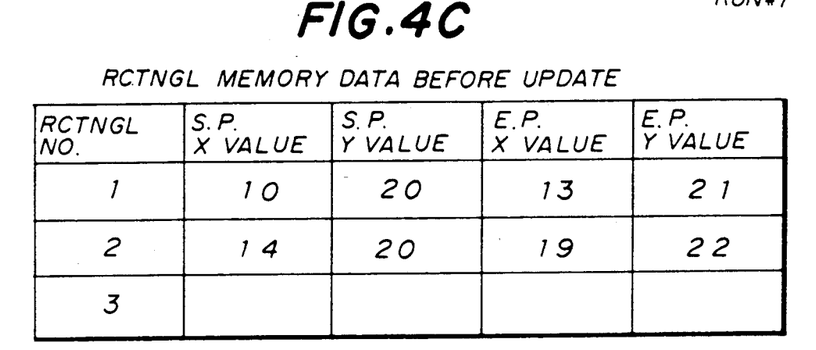
FIGS. 4C and 4D are a rectangle memory data list for explaining the rectangle memory data.

Next, when a run #6 is extracted as shown in FIG. 4B, this run is located close to the run #5 within the rectangle #2 and therefore unified further into a modified rectangle #2. In the rectangle memory 8 at this time, the end point of the rectangle #2 is changed to have the same x and y coordinate values as those of the end point of the run #6. And when a run #7 is next extracted, this run is not located adjacent to any run within the rectangle #1 or within the rectangle #2, and therefore a rectangle #3 is newly registered in the rectangle memory 8. The run #7 is unified into this rectangle #3. As a result, the updating of the rectangle data of rectangle memory 8 is accomplished to produce the rectangle data of rectangle memory 8 as listed in FIG. 4D.

Figure 4D:
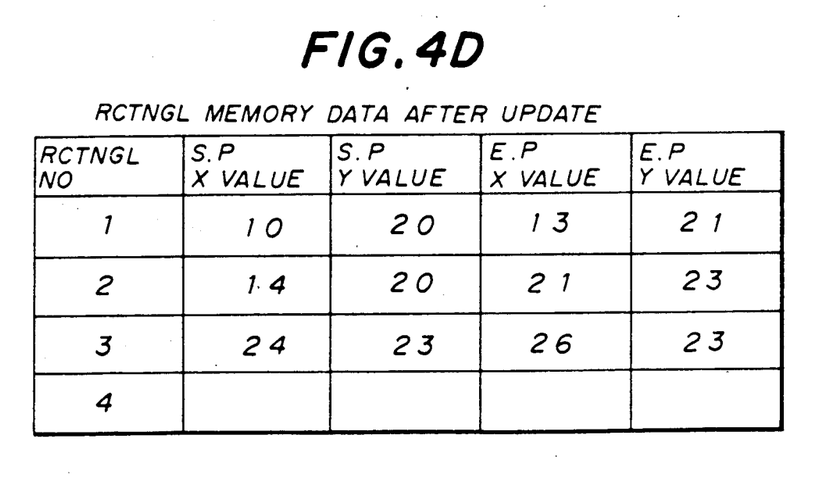

In a possible table region determination step 23 shown in FIG. 2, the possible table region determining part 9 plays a role in which it determines a possible table region. Each rectangle among those rectangles registered in the rectangle memory 8 has a width in the x direction and a height in the y direction which are determined by the rectangle data stored in the rectangle memory 8. The rectangle data comprises x and y coordinate values of a starting point and an end point of each rectangle as shown in FIG. 4D. The step 23 compares each rectangle's width and height with a prescribed width threshold THRx and with a prescribed height threshold THRy, respectively. And the step 23 determines that a rectangle having a width and a height respectively exceeding the THRx and the THRy is a possible table region, and the possible table region determining part 9 transfers the rectangle number of such a rectangle to the control part 3.

In a table region determination step 24 shown in FIG. 2, the table region determining part 10 plays a role in which it determines a table region. This is accomplished in three different steps. First, from among sets of runs within a rectangle extracted as a possible table region which is specified by the control part 3, a run data buffer making step 26 unifies runs which are adjacent to one another and have a length greater than a predetermined threshold value THT, into a possible ruled line. The adjacent runs are selected from among a number of runs within a possible table region which is defined by the rectangle with a rectangle number specified by the control part 3. In this case, this possible ruled line is assumed to be horizontal and not vertical in the original sheet. The possible ruled line data resulting from this step is stored in a run data buffer 11. Next, from among a set of possible ruled lines stored in the run data buffer 11, a possible ruled line having a length exceeding a prescribed length which is approximate to the width of the rectangle is extracted, and such possible ruled lines having a length greater than a prescribed length are counted in sequential order. This step is a ruled line counting step 27 shown in FIG. 2. Finally, the number of the ruled lines counted is compared with a prescribed threshold value THC, and if the number is greater than the THC, then the rectangle concerned is determined to be a table region, and the rectangle number of the rectangle is transferred to the control part 3. And if the number is not greater than the THC, then the rectangle concerned is determined to be any other region than a table region. This is shown as a table region determining step 28 in FIG. 2.

Next, a more detailed description will be given of the run data buffer making step 26 which prepares a run data buffer (RB) which is used in the subsequent procedures as a base on which a table region determination is made. The run data buffer RB has a storage area which contains x-coordinate values of a starting point and an end point corresponding to each of the lines within a rectangle which defines a possible table region. The entire storage area of the run data buffer RB is initially cleared. Starting from a first line within that rectangle, a run having a length greater than a prescribed length is searched for among the lines within the rectangle making up a possible table region. If such a run is found in the k-th line, then the x-coordinate values of that run's starting and end points are checked by comparison with those for the (k−1)-th line already stored in the run data buffer RB. If at least one pixel of that run in the k-th line is located adjacent to any of the pixels of the run in the (k−1)-th line, then the data in the k-th line of the run data buffer RB is updated. The updating of the starting point area for the k-th line is done by writing on the run data buffer RB a value selected from either the k-th line starting point's x coordinate value or the (k−1)-th line starting point's x coordinate value, whichever is smaller. And the updating of the end point area for the k-th line is done by writing a value selected from either the k-th line end point's x coordinate value or the (k−1)-th line end point's x coordinate value, whichever is greater. This procedure is repeated until x coordinate values of the starting and end points of the final run in the final line within that rectangle are stored into the storage area of the run data buffer RB corresponding to the starting and end points of the rectangle as a whole.

In this respect, a run of a vertical ruled line generally has a negligibly small width when compared with the width of a run of a horizontal ruled line, and the runs of the vertical ruled line are ignored. Therefore, the corresponding storage area of run data buffer RB remains cleared.

Figure 5:
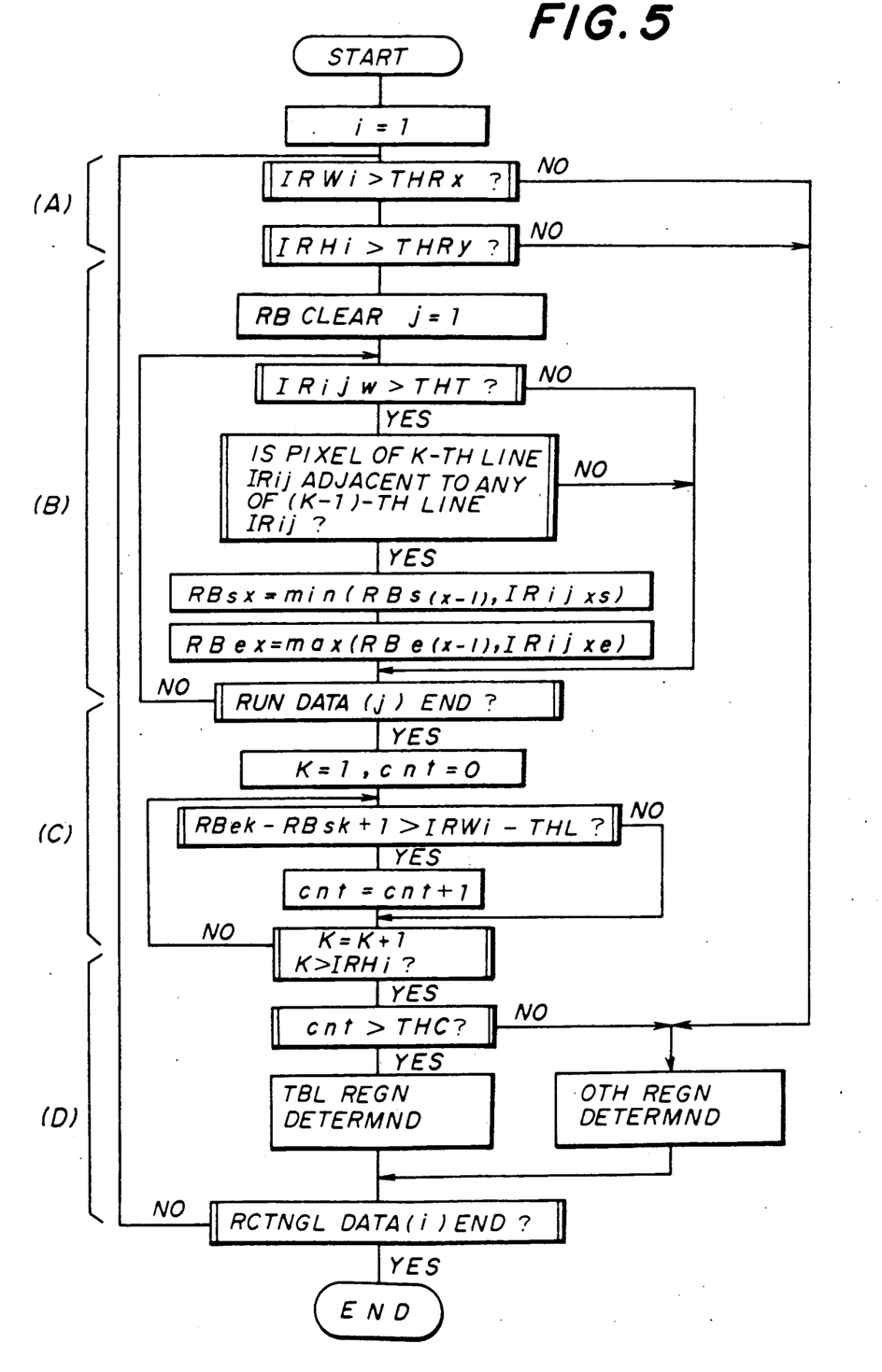
FIG. 5 is a flow chart for explaining the procedures for making a possible table region determination and a table region determination.

FIG. 5 shows a flow chart for explaining the step 23 and the step 24. A section (A) in this chart of FIG. 5 corresponds with the step 23 in FIG. 2, and also sections (B), (C) and (D) in FIG. 5 respectively correspond with the run data buffer making step 26, the ruled line counting step 27 and the table region determining step 28 in FIG. 2.

The notations used in the flow chart of FIG. 5 indicate the following:
i : rectangle number j : run number of run within rectangle
k : data number of run data buffer
IRWi : width of rectangle i
IRHi : height of rectangle i
THRx : width threshold for determining possible table region
THRy : height threshold for determining possible table region
IRijw : width of run j within rectangle i
IRijxs : x coordinate of starting point of run j within rectangle i
IRijxe : x coordinate of end point of run j within rectangle i
THT : threshold for determining possible ruled line
RBsk : x coordinate of k-th starting point in run data buffer
RBek : x coordinate of k-th end point in run data buffer
THL : threshold for determining ruled line
THC : threshold of number of ruled lines Also, it is possible for a procedure for counting the number of lines within the rectangle unified into a possible ruled line and checking if the counted number is a prescribed number to be added to the section (B) of the flow chart shown in FIG. 5. If the height of the rectangle as defined by the number of the lines is greater than a prescribed height, then the processing is branched to a place in the section (D) where a decision is made on whether a region defined by the rectangle is any other region than a table region. Addition of such checking to the above described procedure will help avoid erroneous identification of a photograph region or the like, thus ensuring accurate identification of a table region.

Next, a description will be given of a second embodiment of the present invention, by referring to FIG. 6. This embodiment differs from the first embodiment in the ruled line counting step 27 (FIG. 2). In the first embodiment, all possible ruled lines which have a length approximate to the width of the rectangle are counted as a ruled line. In this embodiment, however, possible ruled lines having a length approximate to the width of the rectangle but being found successively one after the other are ignored. Among the possible ruled lines, only the possible ruled lines which are found not in a successive manner are counted as a ruled line, and the counted number of such lines is used to determine a table region. This allows for improved accuracy of the table region identification.

Figure 6:
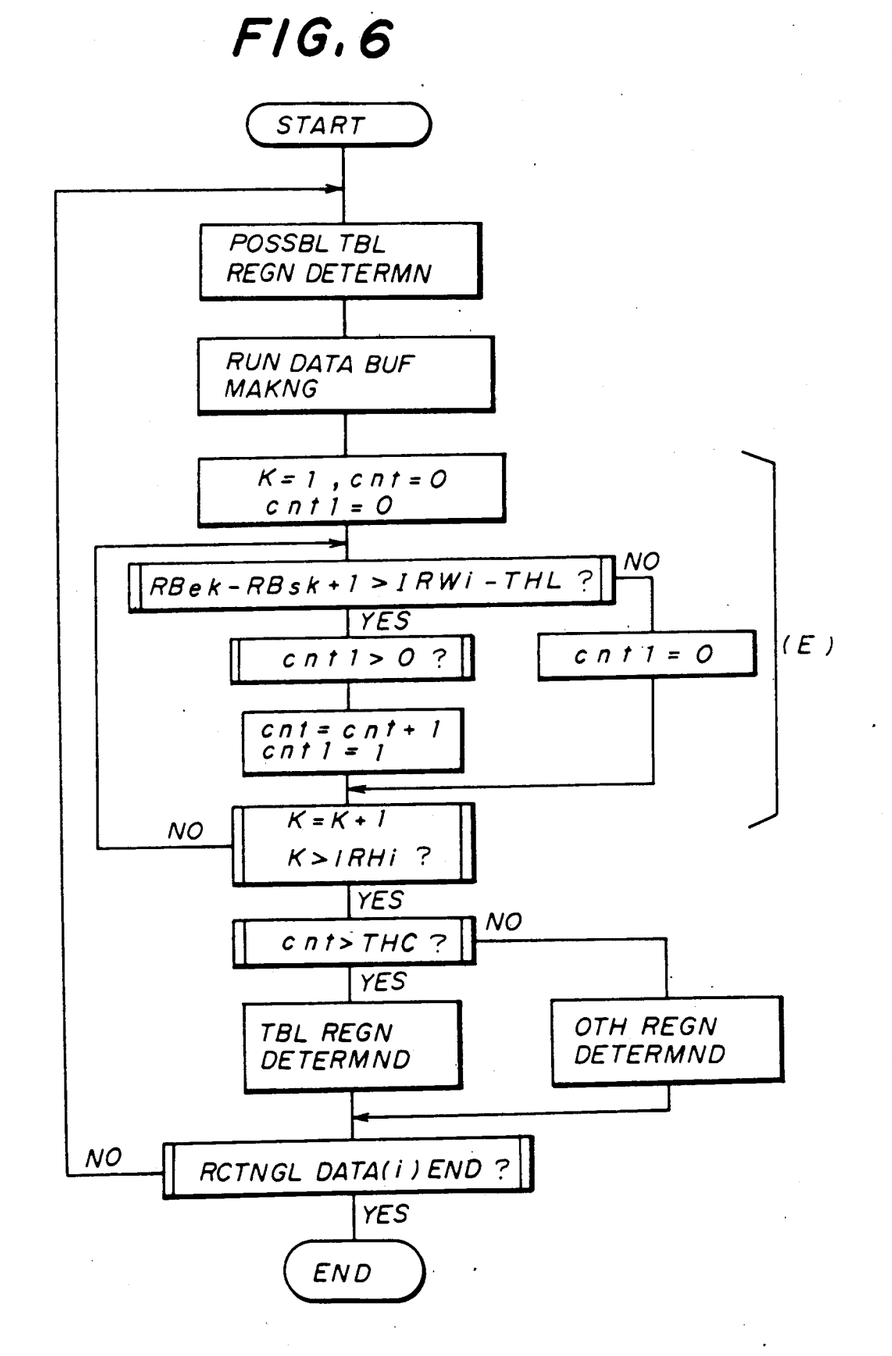
FIG. 6 is a flow chart for explaining another embodiment of the present invention.

FIG. 6 shows a flow chart for explaining the second embodiment. All symbols used in FIG. 6 correspond with those in FIG. 5. A section (E) in the flow chart of FIG. 6 corresponds with the ruled line counting step 27 (the section (C) in FIG. 5). In the section (E) of FIG. 6, cntl is a flag which is used for making a decision on whether a possible ruled line is found successively or independently. If the flag cntl is equal to 0, then the counting of the number of possible ruled lines is not carried out. If the flag cntl is not equal to 0, then the counting is carried out.

Figure 7:
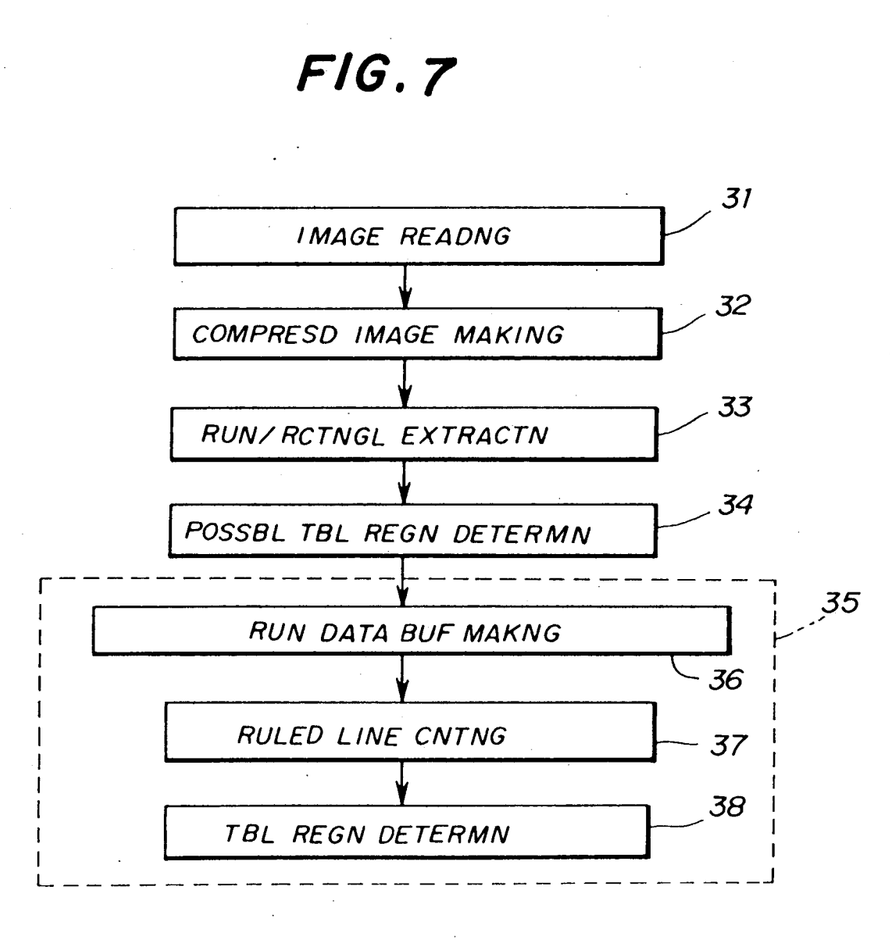
FIG. 7 is a flow chart for explaining still another embodiment of the present invention.

Next, a description will be given of a third embodiment of the present invention, by referring to FIG. 7. Steps 31, 33, 34, and 35 in FIG. 7 are the same as their counterparts in the above described first embodiment. As shown, a compressed image data making step 32 in this embodiment is added to an overall flow of a table region identification method according to the present invention. The compressed image data making step 32 compresses or reduces the input image data into a compressed or reduced image data. The subsequent steps including a run/rectangle extraction step 33, a possible table region determining step 34 and a table region determining step 35 perform necessary procedures for processing such a compressed image data. In this respect, a compressed image making part for carrying out an image data compression is not shown in the table region identification system in FIG. 1. This embodiment is directed to making the amount of the image data to be processed remarkably small, to ensure that the time necessary for the processing is shortened and that the burden on the run memory 6 and on the rectangle memory 8 is lightened during operation. In addition, experimental results show that the ability to identify a table region of an image data when the present invention is applied to 400-dpi image data being compressed to approximately one eighth of the original data amount, does not substantially differ from the case where the original image data which is not compressed is used.

As described in the foregoing, it is possible for the present invention to accurately identify a table region within an image obtained by the optical character reader from an original. The algorithm used in the table region identification steps is simple enough to ensure a high-speed processing.

Further, the present invention is not limited to these embodiments but various variations and modifications may be made without departing from the scope of the present invention.

What is claimed is:

1. A method of locating and identifying a table region within an input image data of an original, said method comprising the steps of:

reading the input image data of the original to store the input image data in an image data memory;

extracting first sets of runs of successively read black picture elements from each line of the input image data stored in the image data memory to store the first sets of the runs in a run memory, each said first set of the runs stored in the run memory including coordinate values of a starting point and an end point of each said run;

unifying adjacent runs among the first sets of the runs stored in the run memory into first rectangles, coordinate values of each of said first rectangles being stored in a rectangle memory;

extracting a second rectangle rom among the first rectangles stored in the rectangle memory, said second rectangle having a width greater than a prescribed width and a height greater than a prescribed height;

unifying second sets of runs of successive black picture elements from each line within said second rectangle to extract ruled lines, each of said second sets of the runs having a length greater than a prescribed length, coordinate values of a starting point and an end point of each said ruled line being stored in a run data buffer;

counting the number of the ruled lines thus extracted from said second sets of the runs stored in the run data buffer within said second rectangle; and making a decision on whether the counted number of the ruled lines is greater than a prescribed number, thus making a determination that said second rectangle makes up the table region in the input image data stored in the image data memory;

the determination that the second rectangle makes up the table region within the original being made based on the number of the ruled lines within the second rectangle thus extracted from the input image data of the original which is stored in the image data memory.

2. A method as claimed in claim 1, wherein said counted number of the ruled lines is checked by comparison with a predetermined height, thus allowing a determination that the second rectangle constitutes any other region than a table region if said counted number exceeds the predetermined height.

3. A method as claimed in claim 1, wherein said ruled lines are extracted from among the second sets of the runs which are adjacent to one another and have a length greater than a prescribed length, thus making a determination that said second sets of the runs are adjacent to one another by comparison of:

(1) coordinate values corresponding to a run in the i-th line within the second rectangle with:

(2) coordinate values corresponding to a run in the (i−1)-th line within the second rectangle stored in the run data buffer.

4. A method as claimed in claim 1, wherein said second sets of the runs from the lines within said second rectangle are unified into ruled lines by:

updating a coordinate value of a starting point for the k-th line by selecting a value from either the k-th line starting point's coordinate value or the (k−1)-th line starting point's coordinate value, whichever is smaller, and updating a coordinate value of an end point for the k-th line by selecting a value from either the k-th line end point's coordinate value or the (k−1)-th line and point's coordinate value, whichever is greater, the coordinate values of starting and end points of each said ruled line are thus stored in the run data buffer.

5. A method as claimed in claim 1, wherein said number of the ruled lines extracted from the second set of the runs within said second rectangle is not increased when the ruled lines are found in a successive manner one line after another within said second rectangle, and said number is increased when the ruled lines are found not in a successive manner.

6. A method as claimed in claim 1, comprising the additional step of compressing the input image data before said extracting step of the first sets of the runs.

* * * * *